United States Patent Office 3,449,334
Patented June 10, 1969

3,449,334
9-[2-(2-PIPERIDINYL)ETHYL] AND 9-[2-(2-PYRROLIDINYL)ETHYL]ACRIDANES
Charles L. Zirkle, Berwyn, Pa., assignor to Smith Kline & French Laboratories, Philadelphia, Pa., a corporation of Pennsylvania
No Drawing. Continuation-in-part of application Ser. No. 602,184, Dec. 16, 1966. This application Oct. 26, 1967, Ser. No. 678,209
Int. Cl. C07d 37/24; A61k 27/00
U.S. Cl. 260—240          12 Claims

ABSTRACT OF THE DISCLOSURE

9-[2-(2-piperidinyl)ethyl] and 9-[2-(2-pyrrolidinyl)ethyl]acridanes, which may be further substituted at the 2, 3, or 10-positions, prepared by Grignard reaction at the 9-position of an acridine or 9-acridanone, in the latter case, the resutling olefin intermediate being hydrogenated to the acridane product. The compounds are sedatives.

---

This application is a continuation-in-part of copending Ser. No. 602,184, filed Dec. 16, 1966, and now abandoned.

This invention relates to acridane compounds having pharmacological activity and to intermediates therefor. In particular, the invention relates to acridine compounds substituted at the 9-position thereof with a 2-heterocyclic-ethyl or 2-heterocyclic-ethylidene group.

The product compounds of the invention are represented by the following structural formula:

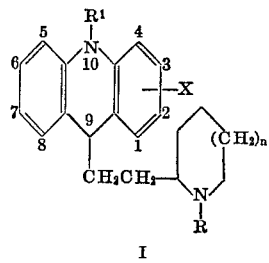

I where
X is hydrogen, chloro, bromo, trifluoromethyl, methyl, methoxy, methylthio, methylsulfinyl, methylsulfonyl, dimethylsulfamoyl, or cyano;
R and $R^1$ are each hydrogen or lower alkyl of 1 to 4 carbon atoms; and
$n$ is 0 or 1.

The indeterminate position of the X substituent is intended to indicate that X may be at the 2 or 3-position.

A preferred group of compounds is represented by Formula II:

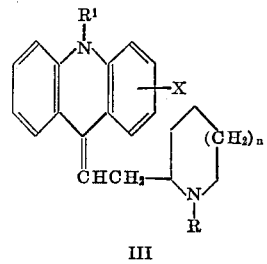

II where X and $n$ are as defined above and $R^1$ is hydrogen or methyl. Within this group of compounds, those where X is chloro and trifluoromethyl are most preferred.

Also included among the compounds of the invention are the pharmaceutically acceptable acid addition salts of the compounds of Formulas I and II, among which are the hydrochloride, hydrobromide, sulfate, nitrate, maleate, tartrate, fumarate, and benzoate.

A further group of compounds considered part of the present invention are the intermediate compounds represented by Formula III.

III where X, R, $R^1$, and $n$ are as defined above, except that $R^1$ is not hydrogen.

The product compounds of the invention are unique in having a heterocyclic substituted ethyl group bonded to the central carbon atom of the acridane nucleus, the heterocyclic group being bonded through one of its carbon atoms, rather than through the nitrogen atom.

These compounds are prepared in the following manner, reference being made to Chart A, below.

CHART A

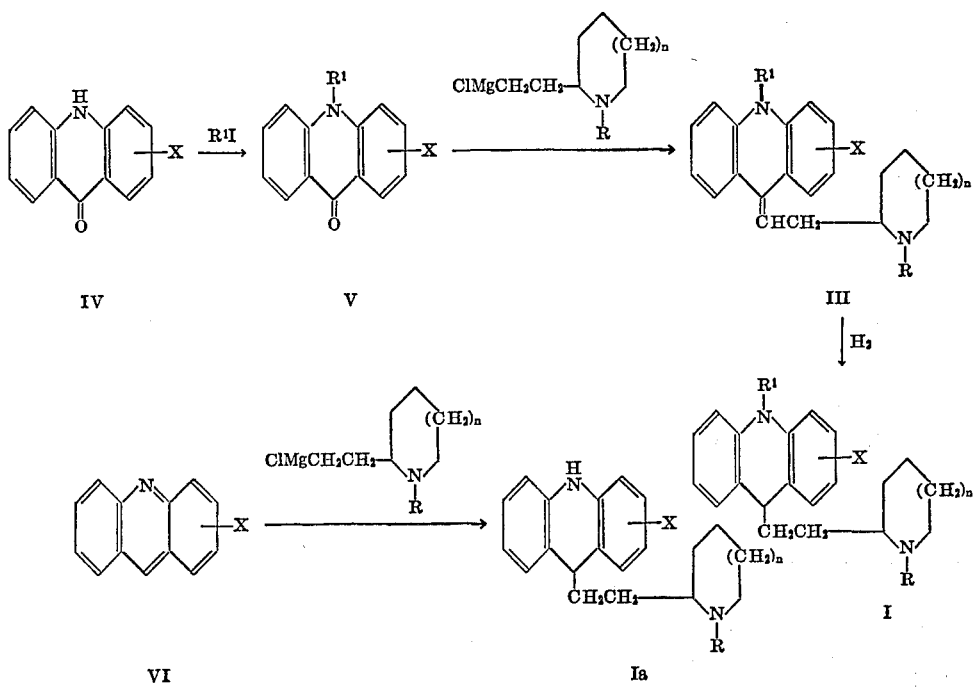

A 9-acridanone, optionally substituted at the 2 or 3-position (IV), is alkylated with a lower alkyl iodide, sulfate, or other halide, and then treated with a Grignard reagent prepared from a 2-piperidinylethyl or 2-pyrrolidinylethyl chloride, optionally alkylated at the nitrogen atom. The Grignard reaction is conducted at reflux temperature in a solvent such as tetrahydrofuran and the resulting intermediate product distilled. Distillation insures that the product consists exclusively of the olefin III, rather than the first-formed hydroxy intermediate, which if isolated can be catalytically reduced to the product. It may also be converted to an acridinum salt by treatment with a mineral acid such as hydrochloric acid; this salt can then be reduced to the product using a hydride reducing agent or catalytically, using a conventional catalyst such as 10% palladium on charcoal, platinum oxide, or Raney nickel.

An alternative method of preparation, the route used for the preparation of compounds where $R^1$ is hydrogen, consists of the C-alkylation of an acridine (VI) with a piperidinyl or pyrrolidinyl ethyl Grignard reagent to give a product (Ia) where the 5-position nitrogen is unalkylated.

The 2 and 3-substituted 9-acridanones and acridines are either described in the literature or are prepared by known methods (see U.S. Patents 3,131,190; 3,043,842). In general, the acridanones are prepared by cyclizing the appropriately substituted diphenylamine-2-carboxylic acid with the aid of a cyclizing reagent such as polyphosphoric acid ester or sulfuric acid. Acridines are prepared by cyclizing with phosphorus oxychloride, converting the resulting 9-chloro compound to a 9-(p-toluenesulfonylhydrazino) derivative, and treating with an alkali metal hydroxide such as sodium hydroxide in aqueous ethylene glycol. The diphenylamine-2-carboxylic acids are prepared by reaction of a halobenzoic acid with an aniline or an aminobenzoic acid with a halobenzene.

The acid addition salts of the product compounds are conventionally prepared by reaction of the basic compound with the acid, either or both of which may be in the form of ether, alcohol, or acetone solutions.

The product compounds of the invention are sedatives. They are active in mice and rats in oral doses of 25–200 mg./kg. when evaluated in the standard dose range test procedure in which the animals are administered a compound and observed for behavioral effects. They may be formulated for use by incorporating them into standard pharmaceutical dosage forms such as capsules, tablets, and injectables containing 0.5–500 mg., the exact dosage varying with the weight and age of the subject being treated and the severity of the condition. Among the pharmaceutical excipients which may be used are lactose, talc, gelatin, magnesium stearate, sodium carboxymethylcellulose, and peanut oil.

The following examples are intended to illustrate the preparation of the compounds of the invention, but are not intended to limit the scope thereof.

EXAMPLE 1

2-chloro-9-[2-(1-methyl-2-piperidinyl)ethyl]acridane

A Grignard reagent is formed under nitrogen from the freshly liberated free base of 18.5 g. (0.0934 moles) of 2-(1-methyl-2-piperidinyl)ethyl chloride hydrochloride and 2.3 g. (0.0934 moles) of mg. turnings in tetrahydrofuran. To this Grignard reagent dissolved in about 100 ml. of tetrahydrofuran is added as a solid 10.0 g. (0.0467 moles) of 2-chloroacridine. The mixture is refluxed and stirred under nitrogen for 5 hours and aqueous ammonium chloride added. The mixture is extracted with ether, the extracts dried with $K_2CO_3$, and the solvent evaporated to give an oil, which when treated with hexane solidifies; M.P. 88–90°. Recrystallization from hexane gives the title product.

A hydrochloride salt is prepared by dissolving the product in ether, adding a saturated ethereal solution of hydrogen chloride, and recovering and purifying the precipitated salt.

EXAMPLE 2

2-trifluoromethyl-9-[2-(1-methyl-2-piperidinyl) ethyl]-10-methylacridane

To a suspension of 52.4 g. (0.2 moles) of 2-trifluoromethyl-9-acridanone in 525 ml. of dimethyl sulfoxide at 70° is added 11.9 g. (0.22 moles) of sodium methoxide. The mixture is heated for ½ hour at 75°, cooled to 40°, and 56.8 g. (0.4 moles) of methyl iodide added over 10 minutes. The mixture is heated at 75° for 1 hour, quenched in water, and filtered. The recovered solid is dissolved in chloroform, filtered, and concentrated to a small volume. Addition of excess hexane gives the 10-methyl ketone, M.P. 180–181°.

To a Grignard reagent, formed from the liberated free base of 16.1 g. (0.0811 moles) of 2-(1-methyl-2-piperidinyl)-ethyl chloride hydrochloride and 1.9 g. of magnesium turnings in tetrahydrofuran, is added as a solid 15.0 g. (0.0541 moles) of the above ketone. The mixture is refluxed with stirring under nitrogen for 4–5 hours, aqueous ammonium chloride added, and the mixture extracted with ether. The ethereal extracts are extracted with 10% HCl, the acidic extracts basified, and the basified mixture extracted with ether. The oil obtained from drying and evaporating the ethereal extracts is distilled to give a yellow oil which is chromatographed with benzene on Woelm #1 basic alumina to give the olefin 2-trifluoromethyl-9-[2-(1-methyl - 2 - piperidinyl)ethylidene]-10-methylacridane, B.P. 192–196°/0.15 mm.

A mixture of 13.8 g. (0.0358 moles) of this olefin and 1.5 g. of 10% palladium on charcoal in 120 ml. of methanol is hydrogenated at 50 p.s.i. of hydrogen at 50° over 2 hours. The catalyst is filtered off and the solvent is evaporated to give, after distillation, the title product, B.P. 196–199°/0.15 mm. A hydrochloride salt is prepared as described in Example 1.

EXAMPLE 3

When the following listed acridines are condensed with the following listed Grignard reagent according to the procedure of Example 1, the corresponding listed products are obtained.

Acridine: 3-chloroacridine
Grignard: 2-(2-piperidinyl)ethyl magnesium chloride
Product: 3-chloro-9-[2-(2-piperidinyl)ethyl]acridane Acridine: 2-methoxyacridine
Grignard: 2-(1-methyl-2-piperidinyl)ethyl magnesium chloride
Product: 2-methoxy-9-[2-(1-methyl-2-piperidinyl)ethyl]acridane Acridine: 3-bromoacridine
Grignard: 2-(1-ethyl-2-piperidinyl)ethyl magnesium chloride
Product: 3-bromo-9-[2-(1-ethyl-2-piperidinyl)ethyl]acridane Acridine: 2-methylacridine
Grignard: 2-(2-pyrrolidinyl)ethyl magnesium chloride
Product: 2-methyl-9-[2-(2-pyrrolidinyl)ethyl]acridane Acridine: 2-trifluoromethylacridine
Grignard: 2-(1-methyl-2-pyrrolidinyl)ethyl magnesium chloride
Product: 2-trifluoromethyl-9-[2-(1-methyl-2-pyrrolidinyl)ethyl]acridane Acridine: 2-chloroacridine
Grignard: 2-(1-methyl-2-pyrrolidinyl)ethyl magnesium chloride
Product: 2-chloro-9-[2-(1-methyl-2-pyrrolidinyl)ethyl]acridane

EXAMPLE 4

When the following listed acridanones are condensed with the following listed Grignard reagents according to the procedure of Example 2, the corresponding listed intermediate products are obtained.

Acridanone: 10-methyl-9-acridanone
Grignard: 2-(2-piperidinyl)ethyl magnesium chloride
Intermediate: 9-[2-(2-piperidinyl)ethylidene]-10-methylacridane Acridanone: 2-methylthio-10-methyl-9-acridanone
Grignard: 2-(1-methyl-2-piperidinyl)ethyl magnesium chloride
Intermediate: 2-methylthio-9-[2-(1-methyl-2-piperidinyl)ethylidene]-10-methylacridane Acridanone: 2-trifluoromethylsulfonyl-10-methyl-9-acridanone
Grignard: 2-(1-ethyl-2-piperidinyl)ethyl magnesium chloride
Intermediate: 2-trifluoromethylsulfonyl-9-[2-(1-ethyl-2-piperidinyl)ethylidene]-10-methylacridane Acridanone: 2-dimethylsulfamoyl-10-methyl-9-acridanone
Grignard: 2-(2-pyrrolidinyl)ethyl magnesium chloride
Intermediate: 2-dimethylsulfamoyl-9-[2-(2-pyrrolidinyl)ethylidene]-10-methylacridane Acridanone: 3-chloro-10-ethyl-9-acridanone
Grignard: 2-(1-methyl-2-pyrrolidinyl)ethyl magnesium chloride
Intermediate: 3-chloro-9-[2-(1-methyl-2-pyrrolidinyl)ethylidene]-10-ethylacridane Acridanone: 2-trifluoromethyl-10-ethyl-9-acridanone
Grignard: 2-(1-ethyl-2-pyrrolidinyl)ethyl magnesium chloride
Intermediate: 2-trifluoromethyl-9-[2-(1-ethyl-2-pyrrolidinyl)ethylidene]-10-ethylacridane When the above intermediate compounds are catalytically hydrogenated according to the procedure of Example 2, the following products, respectively, are obtained.

9-[2-(2-piperidinyl)ethyl]-10-methylacridane
2-methylthio-9-[2-(1-methyl-2-piperidinyl)ethyl]-10-methylacridane
2-trifluoromethylsulfonyl-9-[2-(1-ethyl-2-piperidinyl)ethyl]-10-methylacridane
2-dimethylsulfamoyl-9-[2-(2-pyrrolidinyl)ethyl]-10-methylacridane
3-chloro-9-[2-(1-methyl-2-pyrrolidinyl)ethyl]-10-ethylacridane
2-trifluoromethyl-9-[2-(1-ethyl-2-pyrrolidinyl)-ethyl]-10-ethylacridane

I claim:
1. A compound of the formula

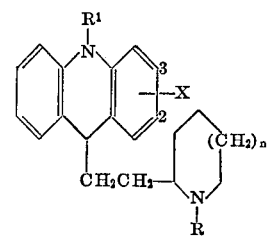

or a pharmaceutically acceptable acid addition salt thereof,
wherein

X is at the 2 or 3-position and is hydrogen, chloro, bromo, trifluoromethyl, methyl, methoxy, methylthio, methylsulfinyl, methylsulfonyl, dimethylsulfamoyl, or cyano;
R and $R^1$ are each hydrogen or lower alkyl of 1 to 4 carbon atoms; and
$n$ is 0 or 1.

2. A compound as claimed in claim 1, wherein $R^1$ is hydrogen or methyl.

3. A compound as claimed in claim 2, where R is hydrogen or methyl; and X is hydrogen, chloro, bromo, trifluoromethyl, or methylmercapto.

4. A compound as claimed in claim 3, wherein R is methyl.

5. A compound as claimed in claim 4, wherein X is 2-chloro, $R^1$ is hydrogen, and $n$ is 1, being the compound 2-chloro-9-[2-(1-methyl-2 - piperidinyl)ethyl]acridane or a pharmaceutically acceptable acid addition salt thereof.

6. A compound as claimed in claim 5, being in the form of the free base.

7. A compound as claimed in claim 4, wherein X is 2-trifluoromethyl, $R^1$ is methyl, and $n$ is 1, being the compound 2-trifluoromethyl-9-[2-(1-methyl-2-piperidinyl)ethyl]-10-methylacridane or a pharmaceutically acceptable acid addition salt thereof.

8. A compound as claimed in claim 7, being in the form of the free base.

9. A compound of the formula

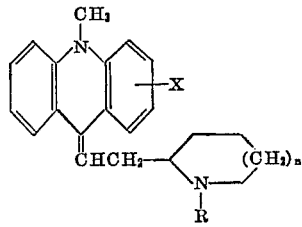

wherein

X is at the 2 or 3-position and is hydrogen, chloro, bromo, trifluoromethyl, methyl, methoxy, methylthio, methylsulfinyl, dimethylsulfamoyl, cyano, or methylsulfonyl; R is hydrogen or lower alkyl of 1 to 4 carbon atoms; and $n$ is 0 or 1.

10. A compound as claimed in claim 9, wherein X is hydrogen, chloro, bromo, trifluoromethyl, or methylmercapto; and R is methyl.

11. A compound as claimed in claim 10, wherein X is 2-chloro and $n$ is 1, being the compound 2-chloro-9-[2-(1-methyl-2-piperidinyl)ethyidenel]-10-methylacridane.

12. A compound as claimed in claim 10, wherein X is 2-trifluoromethyl and $n$ is 1, being the compound 2-trifluoromethyl - 9 - [2 - (1 - methyl - 2 - piperidinyl)ethylidene]-10-methylacridane.

References Cited

UNITED STATES PATENTS

| 3,055,888 | 9/1962 | Renz et al. | 260—240 |
| 3,131,190 | 4/1964 | Zirkle | 260—279 |
| 3,391,143 | 7/1968 | Kaiser et al. | 260—279 |

LEX MAYEL, *Primary Examiner.*

D. G. DAUS, *Assistant Examiner.*

U.S. Cl. X.R.

260—279, 293, 326.8, 999